Patented Nov. 17, 1942

2,302,583

UNITED STATES PATENT OFFICE 2,302,583

PLASTIC COMPOSITION

Richard Stanley Shutt, Columbus, Ohio, assignor to E. I. du Pont de Nemours & Company, Wilmington, Del., a corporation of Delaware No Drawing. Application December 21, 1938,
Serial No. 247,106

10 Claims. (Cl. 260—735)

This invention relates to plastic compositions and more particularly to chlorinated rubber compositions. Chlorinated rubber has been used as a film-forming constituent of coating compositions, particularly for use over metals but is extremely brittle and must therefore be plasticized. Softeners hitherto suggested have not been entirely satisfactory. Esters, drying oils, and the like have a good softening effect but often lose their effect on aging and also reduce the resistance of the composition toward chemical attack, particularly by alkali. On the other hand, hydrocarbons, certain varnishes, and chlorinated hydrocarbons, which are not so deleterious from the point of view of resistance to chemical attack, are not efficient plasticizers and yield compositions which, on drying, have low flexibility and distensibility and therefore have a greater tendency to fail by cracking and flaking when applied as coatings over metal, calcareous surfaces and the like.

This invention has as an object the preparation of improved chlorinated rubber plastic compositions including coating compositions. A further object is the preparation of plasticized chlorinated rubber compositions which are alkali resistant, flexible, and distensible. A still further object is the preparation of plasticized chlorinated rubber compositions which will retain their alkali resistance, flexibility and distensibility over long periods of time. Other objects will appear hereinafter.

These objects are accomplished by the following invention which comprises chlorinated rubber compositions plasticized with a bis-aryloxyalkyl ether.

The ethers used in the invention are bis-aryloxyalkyl ethers, i. e. ethers of the formula Ar—O—R—O—R'—O—Ar' where Ar and Ar' are monovalent aryl radicals which may be different but are preferably the same and R and R' are divalent alkylene radicals which may be different but are preferably the same. They may be made by well known methods, e. g. by reacting bis-chloroalkyl ethers of the formula Cl—ROR'—Cl, where R and R' are divalent alkylene radicals which are preferably the same, with a phenol or naphthol, or a mixture of phenols and/or naphthols in the presence of an alkali metal hydroxide at elevated temperatures. Such methods of making bis-aryloxyalkyl ethers have been described in Izard U. S. Patent 2,003,295.

The bis-aryloxyalkyl ethers useful in this invention include those derived from the substituted phenols or naphthols having substituents such as methyl, ethyl, phenyl, cyclohexyl, halogen, aryloxy or alkoxy groups, and the like. Thus they may be derived, for example, from one or a mixture of ortho-, para-, and meta-cresols, ethylphenol, cyclohexylphenol, chloronaphthol, guaiacol, xylenol, o-chlorophenol, and the like. In all cases, the aryl radicals of the ethers used in the present invention have their free valence belonging directly to a carbon atom of the aromatic nucleus and not to a side-chain. As bis-chloroalkyl ethers, beta, beta'-bis-chloroethyl ether, gamma, gamma'-bis-chloro-propyl ether, and the higher homologs may be used.

The ethers thus include bis-cresoxyethyl ether, bis-xylyloxyethyl ether, bis-orthochlorophenoxyethyl ether, bis-orthomethoxyphenoxyethyl ether, bis-xylyloxybutyl ether, bis-cresoxypropyl ether, as well as others made according to the disclosure of the above Izard patent or by similar methods.

Chlorinated rubber is produced by the action of chlorine on raw or vulcanized rubber and may contain from 30 to 80 per cent chlorine depending on the method of manufacture. It is preferred in this invention to use chlorinated rubber of a chlorine content above 50 per cent, and for the best results a chlorinated rubber of about 67–69 per cent chlorine content should be employed. The viscosity of chlorinated rubber may vary widely although for use in coating compositions a low-viscosity material of about 60–130 centipoises in 20 per cent solution in toluene at 25° C. is preferred. The viscosities given in the examples below are determined in this way.

The compositions which form the subject matter of the present invention comprise a combination of chlorinated rubber with a bis-aryloxyalkyl ether. The resin and the ether may be combined by mixing and stirring, with or without an additional solvent, to form a plastic mass. A solvent is usually added where compositions useful as coating compositions are desired. It is preferred, for economic reasons, to use the cheaper solvents such as the aromatic hydrocarbons or the mixed aliphatic-aromatic hydrocarbons well known to the art. Inclusion of a small proportion of a chlorinated solvent or ester-type solvent is often desirable to yield low-viscosity solutions.

The more detailed practice of the invention is illustrated by the following examples, wherein parts given are by weight unless otherwise stated. There are of course many forms of the invention other than these specific embodiments.

Example I

| | Parts |
|---|---|
| Chlorinated rubber (67–69% chlorine) (viscosity=130 centipoises) | 250 |
| Toluene | 500 |
| Bis-cresoxyethyl ether | 127.5 |

The above materials were mixed in a closed vessel by means of an efficient agitator until a clear, homogeneous solution resulted. Coatings brushed on metal were tough, flexible and of excellent plasticity after drying in the air or at elevated temperatures.

Example II

| | Parts |
|---|---|
| Chlorinated rubber (67-69% chlorine) (viscosity=130 centipoises) | 100 |
| Toluene | 300 |
| Bis-phenoxyethyl ether | 50 |

The materials were mixed by tumbling in a closed vessel until a homogeneous solution was obtained. When applied as a coating composition by brushing, the resulting coating, after thorough drying in air at 65° C. was found to be tough and flexible although slightly hazy.

Example III

| | Parts |
|---|---|
| Chlorinated rubber (67-69% chlorine) (viscosity=130 centipoises) | 100 |
| Toluene | 300 |
| Bis-methoxyphenoxyethyl ether | 50 |

A solution was prepared from these materials by the same procedure as that given in Example II. When applied as coating compositions by brushing, the resulting coating, after drying at 65° C. in air, was tough, flexible, and clear.

Example IV

| | Parts |
|---|---|
| Chlorinated rubber (67-69% chlorine) (viscosity=130 centipoises) | 10 |
| Toluene | 30 |
| Bis-xylyloxyethl ether | 5 |

A solution was prepared from these ingredients by the same procedure as in Examples II and III. When applied as a coating composition by brushing, the resulting coating, after thorough drying in air at 65° C. was found to be tough, flexible and well-plasticized.

The proportions of chlorinated rubber and of bis-aryloxyalkyl ether used to obtain the best results depend somewhat upon the type of chlorinated rubber used, the ether used, and the intended use of the composition. In general, it is preferred to use not less than 1 part of the bis-aryloxyalkyl ether for 10 parts of the resin. A satisfactory degree of pliability and elasticity is usually obtained by using no more than 10 parts of the bis-aryloxyalkyl ether for 10 parts of the chlorinated rubber. In order to obtain maximum toughness, it is particularly preferred to use from 2.5 to no more than 7 parts of bis-aryloxyalkyl ether for 10 parts of resin. The following table is illustrative of the variation in properties obtained by varying the proportion of chlorinated rubber and of bis-aryloxyalkyl ether.

| Chlorinated rubber | Plasticizer | Proportion of chlorinated rubber to plasticizer by weight | Properties of dried film after 2 weeks at 65° C. |
|---|---|---|---|
| Chlorinated rubber (67-69% chlorine), viscosity=130 centipoises. | None | | Very brittle. |
| Do | Bis-cresoxyethyl ether. | 10:2.5 | More flexible than control. |
| Do | do | 10:5 | Tough, good flexibility. |
| Do | do | 10:10 | Soft, pliable film. Slightly tacky. |

It has been found that ethers containing aryl groups derived from substituted phenols are more compatible with chlorinated rubber than ethers comprising aryl groups derived from phenol itself. Further, for reasons of economy and because of somewhat greater compatibility, the ethers of the mononuclear substituted phenols are preferred to the ethers of the polynuclear phenols, such as the naphthols. Similarly, the ethers of diethylene glycol, prepared from a phenol and beta, beta'-bis-chloroethyl ether, are preferred to the aryloxy ethers of the higher dialkylene glycols.

The compositions prepared as described above may be formed or cast into sheets, ribbons, or foils by well-known methods. Fabrics may be coated or impregnated with these compositions by well-known methods. They may also be applied, with excellent results, as coating compositions over rigid substrates such as wood, metal, plaster, concrete, and the like by brushing or spraying. The compositions used may be pigmented or clear. The following example is illustrative of pigmented compositions made according to this invention and suitable for use as coating compositions.

Example V

| | Parts |
|---|---|
| Chlorinated rubber (67-69% chlorine) (viscosity=130 centipoises) | 100 |
| Toluene | 200 |
| Bis-cresoxyethyl ether | 48.5 |
| Titanium oxide | 113.4 |
| Magnesium silicate (Asbestine) | 12.6 |

The chlorinated rubber and toluene were tumbled together in a closed vessel until a clear, homogeneous solution was obtained. The bis-cresoxyethyl ether and the pigments were then stirred into the solution, and the whole ground in a pebble mill, with flint pebbles, for 48 hours, until the pigment was well dispersed to form a smooth composition, free from lumps, suitable for brushing.

A particularly important use of these new compositions is as protective or decorative coatings over alkaline structural surfaces such as concrete, plaster, or asbestos-cement board. They may be used with good success in themselves, particularly when pigmented, as a complete finish over such surfaces, but it is preferred to utilize them as protective primers under subsequently-applied orthodox coating compositions of the oleoresinous type. The following examples are given to illustrate the use of these compositions over alkaline structural materials.

Example VI

Ten parts of Portland cement, 30 parts of sand, and 1 part of slaked lime were mixed with water to yield a concrete mix of normal consistency. The mix was molded into structural units consisting of blocks 12"x12"x1". After drying, the blocks were finished on one face as follows: A primer coat of the composition given in Example I was brushed on to form a uniform coating on each block. After drying, two coats of an oil-modified alkyd resin paint, pigmented with a barium sulfate-extended titanium pigment, were applied, allowing sufficient time for drying between coats.

Structural units prepared as described above were stored indoors with the unpainted back of the panel immersed in water. Under these conditions, the test panels having a protective primer film of the composition of the present invention applied under the oleoresinous top-coats remained in good condition after periods of exposure up to eight weeks. The painted surfaces remained white and unstained, and the film remained hard and completely resistant to removal by rubbing with a damp cloth. On the other hand, panels prepared in the same way as the test panels, except that no protective primer film was applied under the oleoresinous top-coat, became stained and yellowed after only one week's exposure. After two weeks more, the paint film became somewhat tacky and after eight weeks' exposure could be entirely removed by gentle rubbing with a damp cloth.

The compositions described in the present invention use inexpensive hydrocarbon solvents. They are permanently flexible and retain their flexibility at low temperatures, an important property in the field of coating compositions intended for outdoor use. As shown in Example VI, they contribute in a very surprising degree to the durability of otherwise orthodox oleoresinous finishing systems, particularly over alkaline structural surfaces. It is well known in the finishing arts that calcareous structural surfaces, particularly concrete, are hard to finish successfully because oleoresinous paints which show satisfactory durability over metal or wood are not durable over calcareous surfaces, and particularly over freshly-prepared surfaces, such as freshly-plastered walls or new concrete structures. This is believed to be due to degradation of the oleoresinous vehicle by lime or particularly by alkalis formed in the substrate. The paint film soon exhibits severe staining and discoloration, or may fail by severe cracking, flaking, or peeling, or may actually become tacky, depending upon the severity of the atmospheric conditions encountered, and also upon the nature of the calcareous surface. Thus, present paints are particularly liable to discoloration when applied to a concrete wall which is exposed at the back to moisture or to a humid atmosphere. Consequently, calcareous surfaces have customarily been allowed to age for an extended period before painting, which is very inconvenient and often costly. Further, delay in painting merely lessens the degree of failure without overcoming it. These difficulties are now met by use of the compositions of the present invention. Application of a primer film of such a composition under an orthodox oleoresinous paint film prevents completely the severe and early failures heretofore encountered in the painting of concrete.

Where pigmented chlorinated rubber compositions are used over alkaline surfaces as complete coating compositions or as primers under oleoresinous top-coats, the use of alkali-sensitive pigments such as Prussian blue or chrome green should preferably be avoided. All the alkali-insensitive pigments or extenders, i. e. those which are stable toward alkali, including titanium oxide, zinc oxide, basic lead carbonate, barium sulfate, magnesium silicate, iron oxide, and the like may be used successfully.

The above description and examples are intended to be illustrative only. Any modification of or variation therefrom which conforms to the spirit of the invention is intended to be included within the scope of the claims.

I claim:

1. A composition comprising chlorinated rubber and, as a plasticizer therefor, a bis-aryloxyalkyl ether.

2. A composition comprising a chlorinated rubber having a chlorine content of at least 50% and, as a plasticizer therefor, a bis-aryloxyalkyl ether.

3. A composition comprising a chlorinated rubber having a chlorine content of at least 50% and, as a plasticizer therefor, a bis-cresoxyethyl ether.

4. A coating composition comprising chlorinated rubber and, as a plasticizer therefor, a bis-aryloxyalkyl ether.

5. A coating composition comprising a chlorinated rubber having a chlorine content of at least 50% and, as a plasticizer therefor, a bis-aryloxyalkyl ether.

6. A coating composition comprising a chlorinated rubber having a chlorine content of at least 50% and, as a plasticizer therefor, a bis-cresoxyethyl ether.

7. A composition comprising chlorinated rubber of at least 50% chlorine content and, as a plasticizer therefor, a bis-aryloxyethyl ether.

8. A composition comprising chlorinated rubber of at least 50% chlorine content and, as a plasticizer therefor, a bis-cresoxyalkyl ether.

9. A composition comprising chlorinated rubber of at least 50% chlorine content and, as a plasticizer therefor, bis-xylyloxyethyl ether.

10. A composition comprising chlorinated rubber of at least 50% chlorine content and, as a plasticizer therefor, bis-phenoxyethyl ether.

RICHARD STANLEY SHUTT.